(12) United States Patent
Cho

(10) Patent No.: US 6,704,306 B1
(45) Date of Patent: Mar. 9, 2004

(54) VOICE MESSAGE SERVICE METHOD FOR MULTIMEDIA INTERNET PROTOCOL SYSTEM

(75) Inventor: Hyeon Cheol Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/461,108

(22) Filed: Dec. 14, 1999

(30) Foreign Application Priority Data

Dec. 28, 1998 (KR) ........................................ 1998-59385

(51) Int. Cl.[7] .............................................. H04L 12/66
(52) U.S. Cl. ........................ 370/353; 370/352; 370/360
(58) Field of Search ................................. 370/351–354, 370/360, 466, 467

(56) References Cited

U.S. PATENT DOCUMENTS 5,263,080 A  * 11/1993  Jones et al. .................. 370/426
6,307,931 B1 * 10/2001  Vaudreuil ..................... 370/352
6,438,222 B1 *  8/2002  Burg ............................ 370/352

* cited by examiner

Primary Examiner—Wellington Chin
Assistant Examiner—Raj Jain
(74) Attorney, Agent, or Firm—Fleshner & Kim, LLP

(57) ABSTRACT

The present invention relates to a method for transmitting/receiving voice packet data having different encoding techniques through one server in a multimedia internet protocol system. According to the present invention, the voice packets having a predetermined size and a predetermined period which are received from a transmitting IP phone in accordance with each encoding technique are sequentially stored, without performing decoding and encoding operations, and the stored voice packets are sequentially transmitted to a receiving IP phone when a transmission demand is transmitted from the receiving IP phone by a predetermined period.

6 Claims, 2 Drawing Sheets

VOICE MESSAGE SERVICE METHOD FOR MULTIMEDIA INTERNET PROTOCOL SYSTEM

BACKGROUND OF THE INVENTION

1. Field of the Invention

The present invention relates to a voice message service method for a multimedia internet protocol system, and in particular to a voice message service method for a multimedia internet protocol system which can transmit/receive voice packet data having different encoding methods through one server.

2. Description of the Background Art

In a state where a user is not able to answer the phone, if the phone rings, a voice message service serves to answer the phone, store a voice message, and transmit the voice message when the user wants. The voice message service is provided to most of communication products from wire and wireless telephones to mobile phones. In addition, the voice message service is supplied to an internet phone (IP phone) which transmits a voice in an intranet environment or a local area network LAN in an internet environment.

On the other hand, various data including a voice, for example an image and/or a text are transmitted through one network in the LAN environment, differently from a telephone network transmitting/receiving a voice having a size of 64 kbps. Accordingly, the encoding techniques are used. In case a transmitting side and a receiving side employ different encoding techniques, it is impossible to transmit/receive the voice. As a result, servers must be provided in accordance with each encoding technique. In addition, the IP phones using the identical encoding technique to the encoding technique used in the servers must be connected to the servers.

The IP phone at the transmitting side encodes and transmits the voice packet data by using the encoding technique. A software which can process the packet data received according to the encoding technique is provided in a voice message service VMS server. The software stores the periodically-received packet data as a file. When the IP phone demands a message detection, the software divides the stored packet data into a certain size, and periodically transmits the divided packet data. The IP phone at the receiving side receives the voice packet data in accordance with each encoding technique. A bandwidth of the voice packet data is dependent upon the encoding techniques.

For convenience's shake, the G.711 technique and the G.723.1 technique will now be explained as the encoding techniques.

FIG. 1 illustrates devices for performing a conventional voice message service method for a multimedia internet protocol system, and transmission and reception of the voice packet data. A first IP phone, a third IP phone, and a first VMS server employ the G.711 technique, and a second IP phone, a fourth IP phone and a second VMS server utilize the G.723.1 technique. A software processing the G.711 technique is provided to the first VMS server, and a software processing the G.723.1 technique is provided to the second VMS server.

The first IP phone encodes the voice packet data according to the G.711 technique, and transmits the data at a size of 252 bytes per 30 msec. The first VMS server decodes the voice packet data in accordance with the G.711 technique, and stores them as a file. When the third IP phone demands the voice, the first VMS server periodically transmits the stored voice packet data to the third IP phone in accordance with the G.711 technique. Accordingly, the user using the third IP phone receives the voice message from the first IP phone.

The second IP phone encodes the voice packet data in accordance with the G.723.1 technique, and transmits the data at a size of 84 bytes per 90 msec. The second VMS server decodes the data according to the G.723.1 technique, and stores the data as a file. When the fourth IP phone demands the voice, the second VMS server periodically transmits the stored voice packet data to the fourth IP phone in accordance with the G.723.1 technique.

As described above, the voice packet data encoded in accordance with the G.711 technique is compressed and transmitted/received at a size of 252 bytes per 30 msec, and the voice packet data encoded in accordance with the G.723.1 technique is compressed and transmitted/received at a size of 84 bytes per 90 msec. That is, the voice packet data encoded in accordance with the G.711 technique is decoded in accordance with the same technique, and the voice packet data encoded in accordance with the G.723.1 technique is decoded in accordance with the same technique.

Accordingly, in order to utilize the G.711 and G.723.1 techniques, a timer for counting 20 msec, a timer for counting 90 msec, a packet processing variable for processing 252 bytes, and a packet processing variable for processing 84 bytes are necessary. Here, the packet processing variables are required to store the packet data received through a socket, and to decide a data corresponding to a size of the variable.

As shown in FIG. 1, a solid arrow implies that the voice packet data can be transmitted/received between the devices employing the identical encoding technique, and a dotted arrow implies that the voice packet data cannot be transmitted/received between the devices using the different encoding techniques. That is, the encoding technique of the first IP phone is different from that of the second IP phone, and thus the first and third IP phones cannot transmit/receive the voice packet data through the second VMS server. Identically, the second IP phone and the fourth IP phone cannot transmit/receive the voice packet data through the first VMS server.

As a result, the conventional voice message service method has a disadvantage in that the servers as many as the encoding techniques must be provided in order to use various encoding techniques, thereby requiring high price and many devices.

On the other hand, various encoding techniques can be processed through one server in a hardware method. However, in order to respectively process the plurality of encoding techniques, a software must be provided as many as the encoding techniques. That is, a software for processing the G.711 technique and a software for processing the G.723.1 technique are necessary. Accordingly, a work amount of the server and a cost are increased.

SUMMARY OF THE INVENTION

It is therefore a primary object of the present invention to provide a voice message service method for a multimedia internet protocol system which can transmit or receive voice messages having different encoding techniques by using one software in one server.

It is another object of the present invention to provide a voice message service method for a multimedia internet protocol system which can transmit or receive voice messages regardless of encoding techniques.

In order to achieve the above-described objects of the present invention, there is provided a voice message service method for a multimedia internet protocol system wherein voice packets received from a transmitting IP phone at a predetermined size and a predetermined period in accordance with each encoding technique are sequentially stored as a file, without performing decoding and encoding operations, and the stored voice packets are sequentially transmitted to a receiving IP phone, when a transmission demand is transmitted from the receiving IP phone by a predetermined period.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
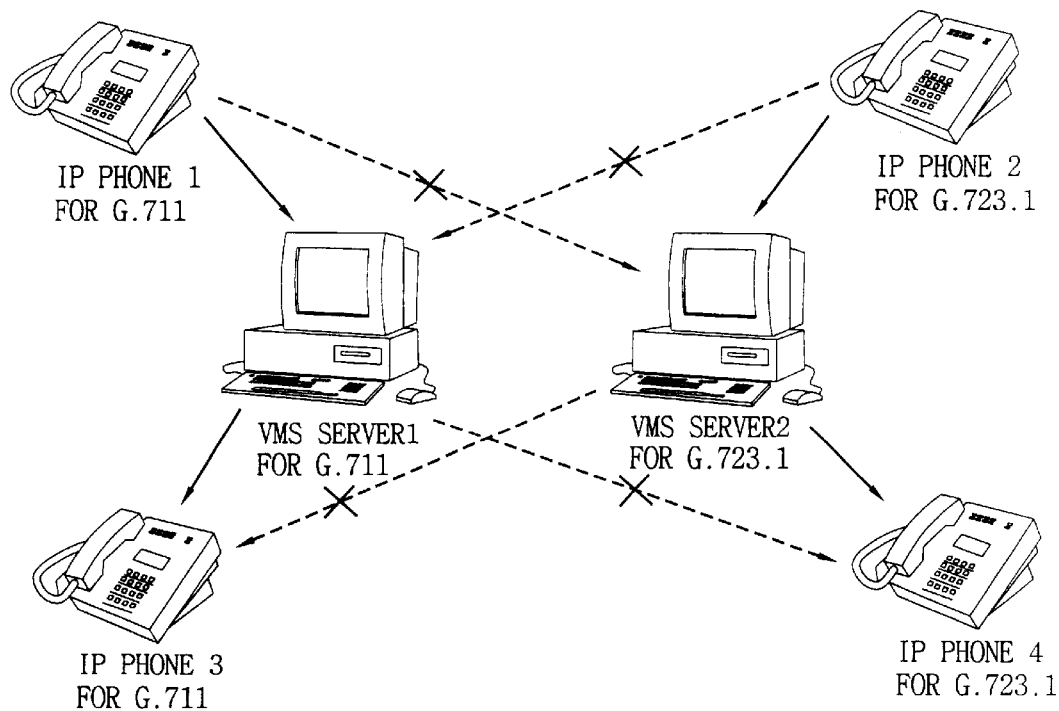
FIG. 1 shows devices of performing a conventional voice message service method for a multimedia internet protocol system, and transmission and reception of a voice packet data.
Figure 2:
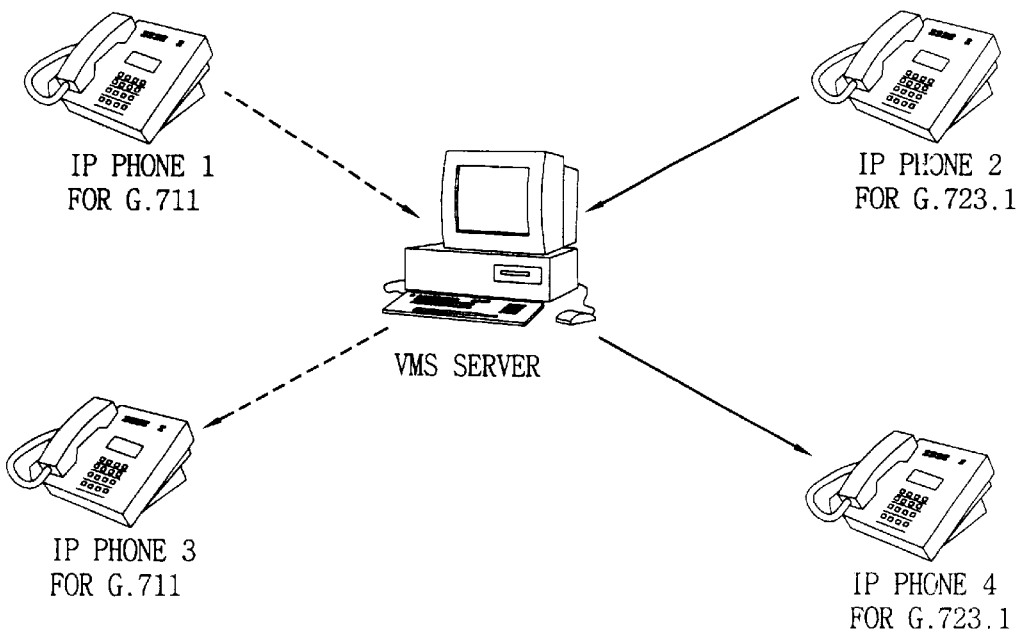
FIG. 2 shows devices of performing a voice message service method for a multimedia internet protocol system, and transmission and reception of a voice packet data in accordance with a preferred embodiment of the present invention.

FIG. 2 shows devices of performing a voice message service method for a multimedia internet protocol system, and transmission and reception of voice packet data in accordance with a preferred embodiment of the present invention. As shown therein, first and third IP phones employ the G.711 technique and are connected to a VMS server, and second and fourth IP phones use the G.723.1 technique and are connected to the VMS server.

The VMS server does not have a timer. A size of a packet processing variable is decided as a size of a largest voice packet data. That is, the size of the packet processing variable is decided as 252 bytes in accordance with the G.711 technique. A process for the VMS server to receive the voice packet data will now be described with reference to FIG. 3.

Figure 3:
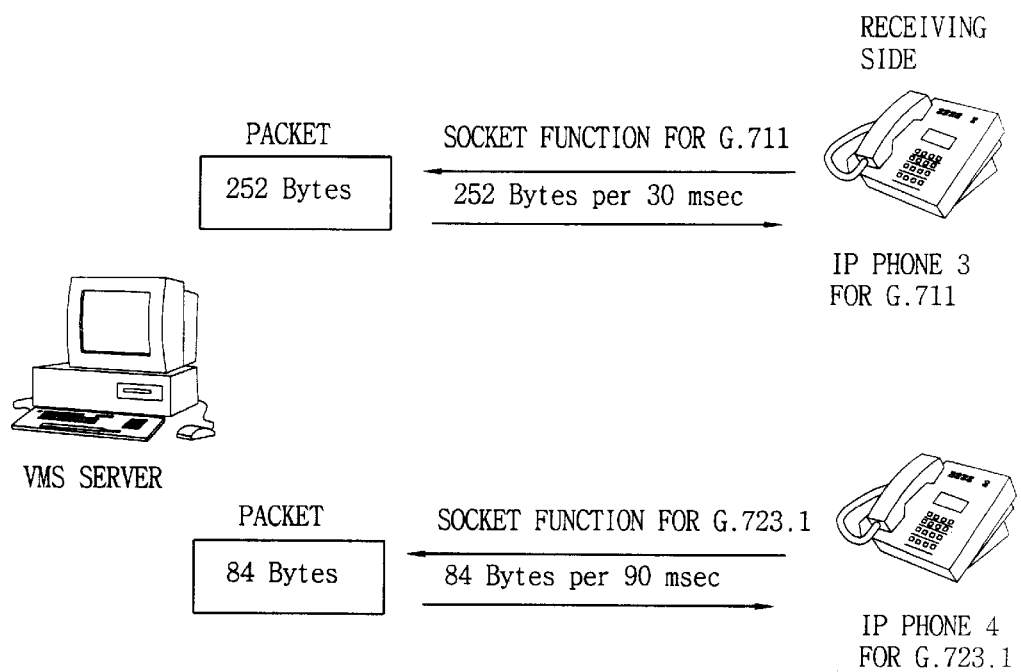
FIG. 3 shows a process for a VMS server to receive the voice packet data in configuration of FIG. 2.

FIG. 3 shows the process for the VMS server to receive the voice packet data in configuration of FIG. 2. As illustrated in FIG. 3, the first IP phone transmits the voice packet data encoded in accordance with the G.711 technique at a size of 252 bytes per 30 msec, and the VMS server compares a size of the voice packet data with 252 bytes which is the size of the previously-set packet processing variable. In this case, the voice packet data and the previously-set packet processing variable are identically 252 bytes, and thus the size of the voice packet data is not varied and is stored as a file.

In addition, the second IP phone transmits the voice packet data encoded in accordance with the G.723.1 technique at a size of 84 bytes per 90 msec, and the VMS server compares 84 bytes which is the size of the voice packet data with 252 bytes which is the size of the previously-set packet processing variable. In this case, the voice packet data having a size of 84 bytes is smaller than the previously-set packet processing variable having a size of 252 bytes by 168 bytes. Accordingly, the size of the packet processing variable is renewed to 84 bytes by removing 168 bytes from the packet processing variable of 252 bytes. Thereafter, the voice packet data of 84 bytes is stored as a file.

That is, the VMS server compares a size of the voice packet data received from the IP phone with a size of the previously-set packet processing variable. When the voice packet data is identical in size to the packet processing variable, the size of the packet processing variable is not varied. On the other hand, in case the voice packet data is not identical in size to the packet processing variable, the size of the received voice packet data is smaller than that of the previously-set packet processing variable. Accordingly, an area of the previously-set packet processing variable which does not have a data, namely an unnecessary area is removed, and thereafter the received voice packet data is stored as a file. Here, it is not necessary to consider the encoding technique of the voice packet data because the decoding operation is not carried out in storing.

The process for the VMS server to output the voice packet data will now be explained.

Figure 4:
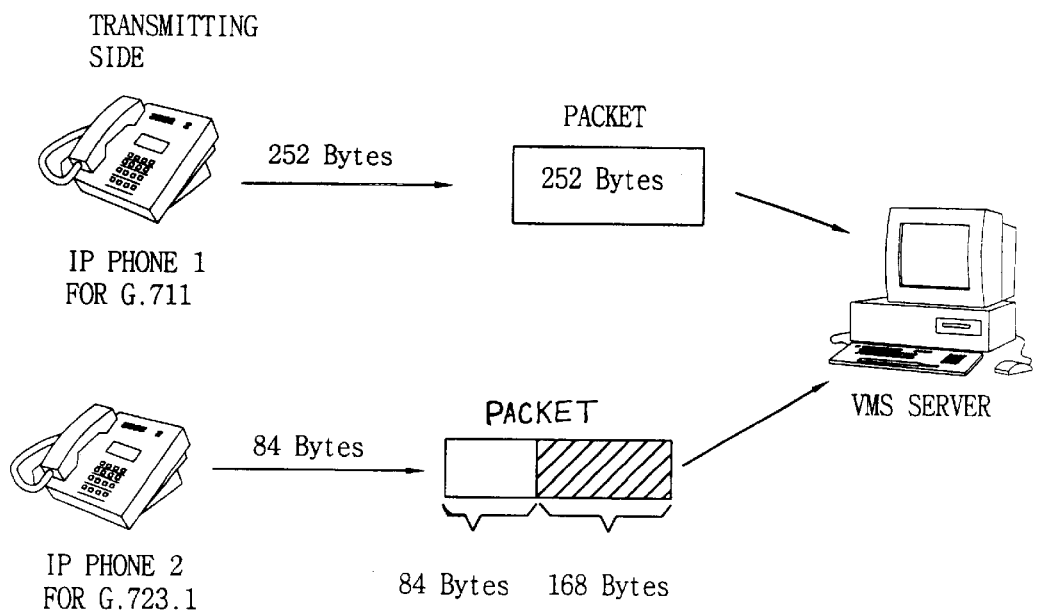
FIG. 4 shows a process for the VMS server to transmit the voice packet data in configuration of FIG. 2.

FIG. 4 shows the process for the server to transmit the voice packet data in the configuration of FIG. 2. As shown therein, when the transmission demand is transmitted from the third IP phone, the VMS server recognizes that the a size of the demanded voice packet data is 252 bytes, based on an inputted socket function, reads the voice packet data of 252 bytes stored as the file, and outputs the data to the third IP phone per 30 msec. Also, when the transmission demand is demanded from the fourth IP phone, the VMS server recognizes that the a size of the demanded voice packet data is 84 bytes, based on an inputted socket function, reads the voice packet data of 84 bytes stored as the file, and outputs the data to the fourth IP phone per 30 msec. Here, the data read from the file has been already encoded, and thus the encoding operation is not required.

That is, when the data transmission demand is transmitted from the IP phone, the VMS server transmits the stored voice packet data. Here, the socket function is transmitted from the IP phone to the VMS server, together with the demand. The socket function includes information of a socket number and a size of the voice packet data. The VMS server recognizes a size of the demanded voice packet data on the basis of the socket function, and transmits the voice packet data having the recognized size to the IP phone. In addition, since the VMS server outputs the demanded voice packet data as soon as the data transmission demand is transmitted from the IP phone, transmission periods of the IP phones in accordance with the encoding techniques can be made identical. That is, the transmission periods of the first and third IP phones, or the transmission periods of the second and fourth IP phones can be made identical. Accordingly, a special process for making the transmission periods identical is not required. Also, the voice packet data is not decoded when stored, and thus it is not necessary to encode the voice packet data in transmission. As a result, the voice message service can be provided regardless of how the voce packet data is encoded.

As discussed earlier, the present invention can transmit/receive the voice packet data encoded in accordance with various encoding techniques by using one software in one server, thereby reducing a cost and increasing efficiency of the server.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A voice message service method comprising:
    a first step for comparing a size of a voice packet data received from a first IP phone with a size of a previously-set packet processing variable;
    a second step for storing the received voice packet data, when the voice packet data is identical in size to the previously-set packet processing variable, and for removing an area which does not have a data from the voice packet data and storing the voice packet data, when the voice packet data is not identical in size to the previously-set packet processing variable; and
    a third step for transmitting the stored voice packet data, when a data transmission demand is transmitted from a second IP phone.

2. The method according to claim 1, wherein a size of the previously-set packet processing variable is decided as a largest size of the various encoding techniques.

3. The method according to claim 1, wherein the third step receives a socket function from the second IP phone, recognizes a size of a voice packet data to be transmitted, on the basis of the socket function, and transmits the voice packet data having the recognized size.

4. A recording medium recorded with a voice message service program comprising:
    a first step for comparing a size of a voice packet data received from a first IP phone with a size of a previously-set packet processing variable;
    a second step for storing the received voice packet data, when the voice packet data is identical in size to the previously-set packet processing variable, and for removing an area which does not have a data from the voice packet data and storing the voice packet data, when the voice packet data is not identical in size to the previously-set packet processing variable; and
    a third step for transmitting the stored voice packet data, when a data transmission demand is transmitted from a second IP phone.

5. The recording medium according to claim 4, wherein a size of the previously-set packet processing variable is decided as a largest size of the various encoding techniques.

6. The recording medium according to claim 4, wherein the third step receives a socket function from the second IP phone, recognizes a size of a voice packet data to be transmitted, on the basis of the socket function, and transmits the voice packet data having the recognized size.

* * * * *